United States Patent
Evans et al.

(10) Patent No.: US 10,247,170 B2
(45) Date of Patent: Apr. 2, 2019

(54) SYSTEM AND METHOD FOR CONTROLLING A DYNAMIC SYSTEM

(71) Applicant: General Electric Company, Schenectady, NY (US)

(72) Inventors: Scott Charles Evans, Burnt Hills, NY (US); Sara Simonne Louisa Delport, Bayern (DE); Samuel Davoust, Bayern (DE); Yunwen Xu, Fremont, CA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 217 days.

(21) Appl. No.: 15/175,771

(22) Filed: Jun. 7, 2016

(65) Prior Publication Data

US 2017/0350369 A1     Dec. 7, 2017

(51) Int. Cl.
| | |
|---|---|
| F03D 7/04 | (2006.01) |
| F03D 13/20 | (2016.01) |
| F03D 17/00 | (2016.01) |
| F03D 1/06 | (2006.01) |
| G05B 19/04 | (2006.01) |
| F03D 7/02 | (2006.01) |
| G05B 13/02 | (2006.01) |

(52) U.S. Cl.
CPC .............. *F03D 7/048* (2013.01); *F03D 1/06* (2013.01); *F03D 7/0224* (2013.01); *F03D 7/045* (2013.01); *F03D 7/047* (2013.01); *F03D 13/20* (2016.05); *F03D 17/00* (2016.05); *G05B 13/027* (2013.01); *G05B 19/04* (2013.01); *G05B 2219/2619* (2013.01)

(58) Field of Classification Search
CPC .......... F03D 7/048; F03D 13/20; F03D 7/047; F03D 7/0224; F03D 1/06; F03D 17/00; F03D 7/045; G05B 19/04; G05B 13/027; G05B 2219/2619

USPC .............. 700/287, 290, 170, 219, 292
See application file for complete search history.

(56) References Cited

U.S. PATENT DOCUMENTS

| | | | |
|---|---|---|---|
| 8,928,164 B2 | 1/2015 | Bowyer et al. | |
| 2006/0033338 A1* | 2/2006 | Wilson | F03D 1/0608 290/44 |
| 2010/0023174 A1 | 1/2010 | Nagata et al. | |
| 2011/0123331 A1 | 5/2011 | Stiesdal | |
| 2012/0029843 A1 | 2/2012 | Byreddy et al. | |

(Continued)

FOREIGN PATENT DOCUMENTS

EP     2048562 B1     8/2009

OTHER PUBLICATIONS

Edzel,Wind turbine performance assessment using multi-regime modeling approach. Article. Retrieved from internet: <URL: https://ac.els-cdn.com/S0960148112001577/1-s2.0-S0960148112001577-main.pdf?_tid=9098b6c0-35af-42f2-b54f-c5f143de6651&acdnat=1520301353_1eb777c4be8c96dc85b13f97d8a7c125> (Year: 2012).*

(Continued)

*Primary Examiner* — Robert E Fennema
*Assistant Examiner* — Marzia T Monty
(74) *Attorney, Agent, or Firm* — GE Global Patent Operation; Nitin Joshi

(57) ABSTRACT

A control system for a dynamic system including at least one measurement sensor. The system includes at least one computing device configured to generate and transmit at least one regulation device command signal to at least one regulation device to regulate operation of the dynamic system based upon at least one inferred characteristic.

12 Claims, 8 Drawing Sheets

(56) References Cited

U.S. PATENT DOCUMENTS

| | | | |
|---|---|---|---|
| 2012/0120230 A1* | 5/2012 | Wilkerson | G01W 1/08 |
| | | | 348/135 |
| 2012/0185414 A1 | 7/2012 | Pyle et al. | |
| 2013/0184838 A1 | 7/2013 | Tchoryk, Jr. et al. | |
| 2014/0003939 A1 | 1/2014 | Adams et al. | |
| 2014/0336833 A1 | 11/2014 | Marinopoulos et al. | |
| 2015/0056072 A1 | 2/2015 | Perley et al. | |
| 2015/0176569 A1* | 6/2015 | Karikomi | G01M 15/14 |
| | | | 702/34 |
| 2016/0005522 A1 | 1/2016 | Dagnino et al. | |
| 2017/0175709 A1 | 6/2017 | Daher Adegas et al. | |

OTHER PUBLICATIONS

Liu Zhangjun (CN 106022960 A), translated by google search engine. Application filed on May 19, 2016; [retrieved on Sep. 6, 2018]. Retrieved from internet: <https://patents.google.com/patent/CN106022960A/en?oq=CN+106022960+A> (Year: 2016).*

P D Towers et al., Wind turbine gust estimation using remote sensing data, Control (Control), 2014 UKACC International Conference on, pp. 349-354, Jul. 9-11, 2014, Loughborough.

R AK et al., "Two Machine Learning Approaches for Short-Term Wind Speed Time-Series Prediction", IEEE Transactions on Neural Networks and Learning Systems, vol. PP, Issue: 99, pp. 1, Apr. 22, 2015.

International Search Report and Written Opinion issued in connection with corresponding PCT Application No. PCT/US17/34611 dated Aug. 22, 2017.

* cited by examiner

SYSTEM AND METHOD FOR CONTROLLING A DYNAMIC SYSTEM

BACKGROUND

The field of the disclosure relates to dynamic systems, and more particularly to a system and method for controlling a dynamic system based upon one or more inferred characteristics.

Many known systems include interconnected dynamic elements that change over time, and such systems are known as dynamic systems. One known dynamic system includes wind inflow acting on a wind turbine. Most known wind turbines include a rotor having multiple blades. The rotor is sometimes coupled to a housing, or nacelle, that is positioned on top of a base, for example, a tubular tower. At least some known utility grade wind turbines, i.e., wind turbines designed to provide electrical power to a utility grid, include rotor blades having predetermined shapes and dimensions. The rotor blades transform kinetic wind energy into induced blade aerodynamic forces that further induce a mechanical rotational torque that drives one or more generators that generate electric power. A plurality of wind turbine generators in a localized geographic array is typically referred to as a wind farm or a wind park.

Wind turbines are exposed to large variations in wind inflow, which exerts varying loads to the wind turbine structure, particularly the wind turbine rotor and shaft. Wind characteristics, such as wind shear, can be used to enable better turbine control to increase power performance and annual energy production and reduce mechanical loads.

Some known approaches have been employed to address the issue of measuring wind characteristics for a wind turbine. One such approach is to use LiDAR sensors, met-mast sensors, or radar sensors. However, these sensors are costly and their performance is often subject to weather conditions.

BRIEF DESCRIPTION

In one aspect, a control system for a dynamic system is provided. The control system includes at least one measurement sensor coupled to the dynamic system. The control system also includes at least one regulation device configured to regulate operation of the dynamic system as a function of at least one characteristic. The control system also includes at least one computing device coupled to the at least one measurement sensor and the at least one regulation device. The at least one computing device is configured to receive at least one measurement signal from the at least one measurement sensor, wherein the at least one measurement signal includes measurement data. The at least one computing device is further configured to classify using the measurement data a profile from which to infer the at least one characteristic. The at least one computing device is also configured to infer the at least one characteristic based on the profile. The at least one computing device is further configured to generate at least one regulation device command signal based on the at least one characteristic. The at least one computing device is also configured to transmit the at least one regulation device command signal to the at least one regulation device to regulate operation of the dynamic system.

In another aspect, a method for controlling a dynamic system is provided. The dynamic system includes at least one measurement sensor coupled to the dynamic system. The dynamic system also includes at least one regulation device. The dynamic system further includes at least one computing device coupled to the at least one measurement sensor and the at least one regulation device. The method includes receiving, by the at least one computing device, at least one measurement signal from the at least one measurement sensor. The at least one measurement signal includes measurement data. The method also includes classifying, by the at least one computing device using the measurement data, a profile from which to infer at least one characteristic. The method further includes inferring, by the at least one computing device, the at least one characteristic based on the profile. The method also includes generating, by the at least one computing device, at least one regulation device command signal based on the at least one characteristic. The method further includes transmitting, by the at least one computing device, the at least one regulation device command signal to the at least one regulation device to regulate operation of the dynamic system.

In yet another aspect, a wind turbine park is provided. The wind turbine park includes a plurality of wind turbines including an operating wind turbine. The wind turbine park also includes at least one measurement sensor coupled to at least one wind turbine. The wind turbine park further includes at least one wind turbine regulation device configured to regulate operation of the at least one wind turbine as a function of at least one wind characteristic. The wind turbine park also includes at least one computing device coupled to the at least one measurement sensor and the at least one wind turbine regulation device. The at least one computing device configured to receive at least one measurement signal from the at least one measurement sensor. The at least one measurement signal includes measurement data. The at least one computing device is further configured to classify, using the measurement data, a wind profile from which to infer the at least one wind characteristic. The at least one computing device is further configured to infer the at least one wind characteristic based on the wind profile. The at least one computing device is also configured to generate at least one wind turbine regulation device command signal based on the at least one wind characteristic. The at least one computing device is further configured to transmit the at least one wind turbine regulation device command signal to the at least one wind turbine regulation device to regulate operation of the wind turbine park.

DRAWINGS

These and other features, aspects, and advantages of the present disclosure will become better understood when the following detailed description is read with reference to the accompanying drawings in which like characters represent like parts throughout the drawings, wherein.

Figure 1:
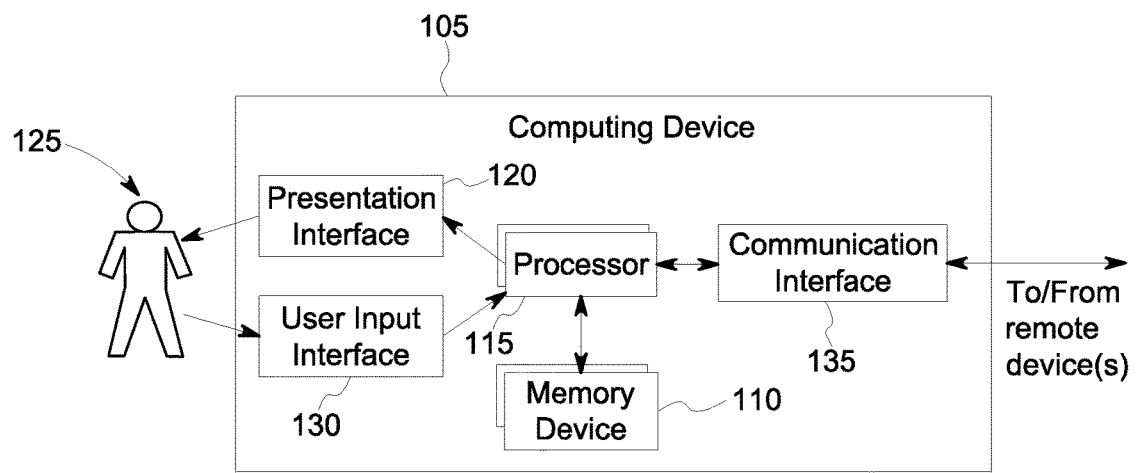
FIG. 1 is a block diagram of an exemplary computing device.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION OF THE DISCLOSURE

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The control systems described herein provide a method for inferring one or more characteristics using one or more sensors. The one or more characteristics are inferred in real-time and are used to regulate operation of a dynamic system, such as a wind turbine. Specifically, the embodiments described herein include control systems that utilize sensor measurements to (1) classify a profile to determine an appropriate model from which the one or more characteristics are inferred, and (2) infer the one or more characteristics from the model. In the exemplary embodiment, a wind turbine control system is configured to infer one or more wind characteristics using sensor measurements and control the operation of the wind turbine at least partially using the one or more inferred wind characteristics.

FIG. 1 is a block diagram of an exemplary computing device 105 used to infer one or more characteristics based on sensor measurements received from one or more sensors. In one embodiment, computing device 105 is used to infer one or more wind characteristics based on sensor measurements received from one or more sensors on a wind turbine. In this embodiment, computing device 105 is further used to facilitate operation of a wind turbine (not shown in FIG. 1) through a wind turbine control system (not shown in FIG. 1). Computing device 105 controls the operation of the wind turbine at least partially using the one or more inferred wind characteristics.

Computing device 105 includes a memory device 110 and a processor 115 operatively coupled to memory device 110 for executing instructions. In some embodiments, executable instructions are stored in memory device 110. Computing device 105 is configurable to perform one or more operations described herein by programming processor 115. For example, processor 115 may be programmed by encoding an operation as one or more executable instructions and providing the executable instructions in memory device 110. In the exemplary embodiment, memory device 110 is one or more devices that enable storage and retrieval of information such as executable instructions and/or other data. Memory device 110 may include one or more computer readable media.

Memory device 110 is configured to store sensor data. For example, memory device 110 stores, without limitation, atmospheric condition measurements, wind turbine operational data, mechanical load measurements, blade pitch angle measurements, and/or any other type data. Also, memory device 110 includes, without limitation, sufficient data, algorithms, and commands to facilitate (i) generating data-driven classifications of a profile from the sensor data to determine an appropriate physics-based model from which the one or more characteristics are inferred, (ii) inferring the one or more characteristics from the model, and (iii) using the one or more characteristics to regulate a dynamic system. In the exemplary embodiment, memory device 110 includes, without limitation, sufficient data, algorithms, and commands to facilitate (a) generating data-driven classifications of a wind profile from the sensor data to determine an appropriate model from which the one or more wind characteristics are inferred, (b) inferring the one or more wind characteristics from the model, and (c) using the one or more wind characteristics to regulate the wind turbine.

In some embodiments, computing device 105 includes a presentation interface 120 coupled to processor 115. Presentation interface 120 presents information to a user 125. In some embodiments, presentation interface 120 includes one or more display devices and presents, for example, sensor data and/or characteristics to user 125 using a human machine interface (HMI) (not shown in FIG. 1). Also, in some embodiments, computing device 105 includes a user input interface 130. In the exemplary embodiment, user input interface 130 is coupled to processor 115 and receives input from user 125.

A communication interface 135 is coupled to processor 115 and is configured to be coupled in communication with one or more other devices, such as one or more sensors, a wind turbine control device, or another computing device 105, and to perform input and output operations with respect to such devices while performing as an input channel. Communication interface 135 receives data from and/or transmits data to one or more remote devices. For example, a communication interface 135 of computing device 105 transmits a signal to the communication interface 135 of another computing device 105. In some embodiments, communication interface 135 is a wireless interface.

In some embodiments, computing device 105 is used to facilitate operation of a plurality of wind turbines (not shown in FIG. 1) through a wind turbine park control system (not shown in FIG. 1). In these embodiments, computing device 105 includes sufficient computer-readable/executable instructions, data structures, program modules, and program sub-modules, to receive other data associated with measured values from other wind turbines and wind turbine systems to facilitate overall operation of the wind turbine park.

Figure 2:
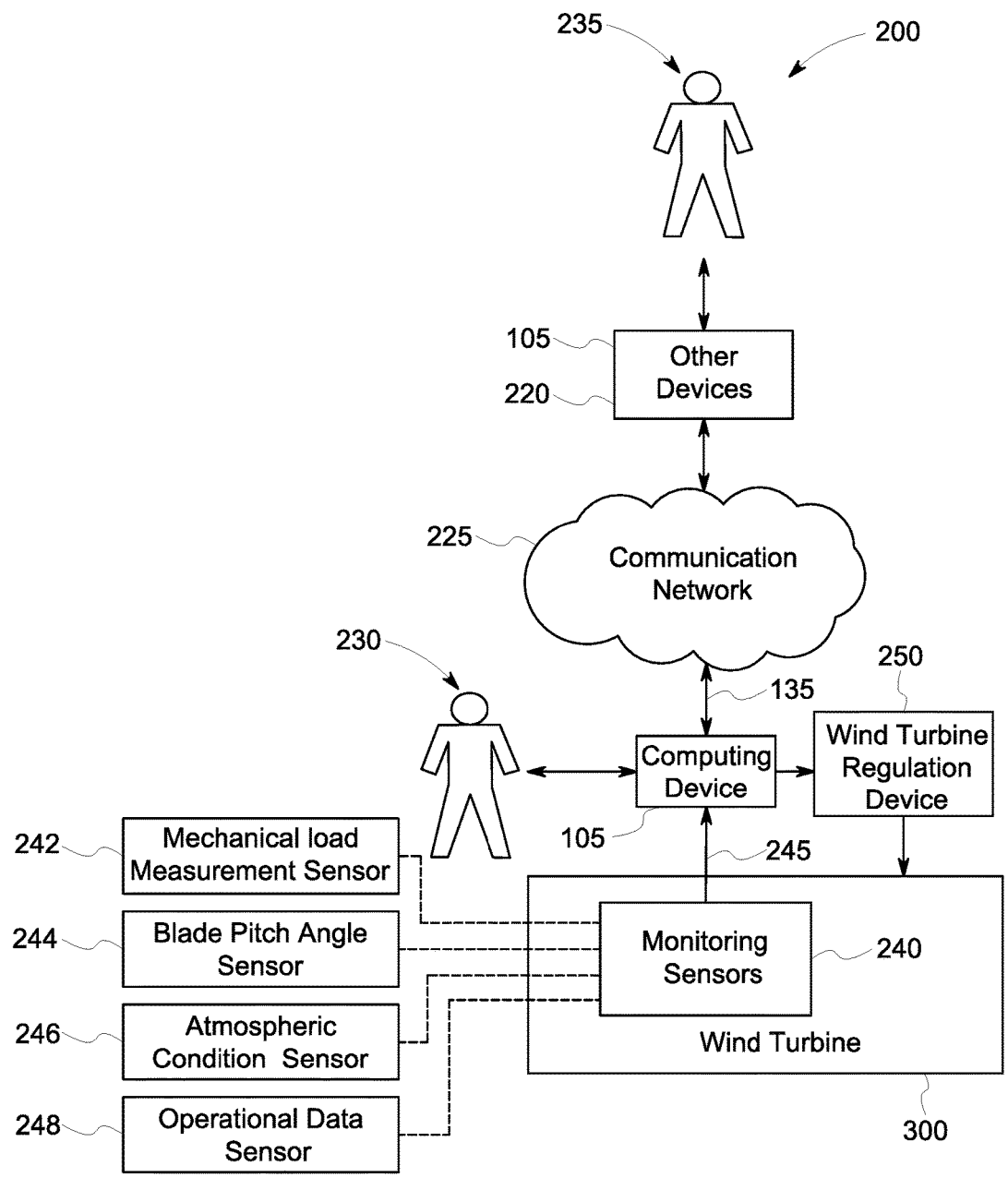
FIG. 2 is a block diagram of a portion of an exemplary wind turbine control system that includes the computing device shown in FIG. 1.

FIG. 2 is an exemplary block diagram of a portion of a wind turbine control system 200 that infers one or more wind characteristics using one or more monitoring sensors 240 (also known as measurement sensors) on a wind turbine 300. Wind turbine control system 200 is further used to control at least a portion of wind turbine 300. In the exemplary embodiment, wind turbine control system 200 infers a wind shear characteristic, as described below.

In some embodiments, wind turbine control system 200 includes sufficient computer-readable/executable instructions, data structures, program modules, and program sub-modules, to receive other data associated with measured values from other wind turbine systems to facilitate overall operation of wind turbine 300. Alternatively, wind turbine control system 200 is a stand-alone system. Further, alternatively, wind turbine control system 200 is any computer-based system that monitors portions of, and infers one or more wind characteristics for wind turbine 300. In the exemplary embodiment, wind turbine control system 200 includes computing device 105 configured to execute monitoring algorithms and monitoring logic. Computing device 105 is coupled to other devices 220 via a network 225. In some embodiments, network 225 is a wireless network.

In the exemplary embodiment, computing device 105 is coupled to network 225 via communication interface 135. In an alternative embodiment, computing device 105 is integrated with other devices 220.

In the exemplary embodiment, wind turbine 300 includes one or more monitoring sensors 240 coupled to computing device 105 through at least one input channel 245. Sensors 240 include one or more mechanical load sensors 242 for obtaining load measurements. Sensors 240 may also include one or more blade pitch angle sensors 244 for obtaining blade pitch angle measurements, one or more atmospheric condition sensors 246 for obtaining atmospheric condition measurements, and/or one or more operational data sensors 248 for obtaining operational data measurements. Sensors 240 collect measurements including, without limitation, yaw, nod, pitch, multi-blade coordinate (MBC) estimated wind speed, electric output, bending moments, torsional moments, and rotations per minute (RPM) emanating from portions of wind turbine 300. Sensors 240 produce measurement sensor-signals of wind turbine 300 that are transmitted to computing device 105. Such data is transmitted across network 225 and is accessed by any device capable of accessing network 225 including, without limitation, desktop computers, laptop computers, and personal digital assistants (PDAs) (neither shown).

Sensors 240 repeatedly, e.g., periodically, continuously, and/or upon request, transmit measurement readings at the time of measurement. Alternatively, any number of measurements, any interval time, and any time window are established that enable operation of wind turbine 300 and wind turbine control system 200 as described above.

In the exemplary embodiment, computing device 105 is configured to infer a wind shear characteristic. Computing device 105 classifies a shear profile derived from one or more sensor measurements. Based on the shear profile, computing device 105 determines an appropriate model from which the shear characteristic should be inferred. Computing device 105 then infers the shear characteristic from the model.

More specifically, computing device 105 uses a supervised machine learning method, such as a random forests algorithm, on the sensor measurement data to classify whether the shear profile behaves according to a wind shear power law profile (as is normally assumed) or whether the profile is low level jet (where lower speed is experienced at higher elevation) or flat speed distribution (where higher elevation speed exceeds a power law prediction).

In the exemplary embodiment, the shear profile is classified using a random forests model that has been previously trained on historical data where sensors at, in one embodiment, five different elevations are configured to record prime standard wind speeds (for example, from a multi sensor Metmast or Lidar/Sodar). The random forest algorithm grows multiple decision trees. These multiple decision trees are sometimes referred to as an ensemble of trees or a random forest. Once the model has been trained, real time loads information is then applied to the ensemble of trees to obtain a classification about whether the shear profile behaves according to a power law or if a different shear profile is in effect.

After the profile has been classified using a random forest model (or other supervised machine learning model such as ridge regression, and neural network), the characteristics of the shear model can be determined from the data. If the profile is a power law profile, a single characteristic a (alpha) characterizes the shear profile. The wind profile power law is given by:

$$V(h)/V(HH)=(h/HH)^\alpha, \quad \text{Eq. (1)}$$

where V=wind velocity, HH=height 1 (lower height), h=height 2 (upper height), and α=wind shear exponent. Wind shear is quantified as the wind shear exponent α in the power law equation that relates wind speeds at two different heights. The wind shear exponent α can be determined from the data by minimizing a fitting error metric, eg., mean squared error, between the training data and the power law shear profile. In practice, α varies with such characteristics as elevation, time of day, season, temperature, terrain, and atmospheric stability. A larger exponent means a larger vertical gradient in the wind speed. If computing device 105 determines that the shear profile is consistent with the power law, the wind shear exponent α is inferred as the wind shear characteristic.

If the profile is not a power law, two characteristics are determined that can describe a more complex shear profile. More specifically, if computing device 105 determines that the shear profile does not behave according to the wind profile power law, computing device 105 uses a fitted quadratic model with a and b characteristics in a quadratic fit. The fitted quadratic model represents a low level jet (LLJ) stream or a flat (near linear) speed distribution. The fitted quadratic model is given by:

$$V(h)=V(HH)[a(h-HH)^2+b(h-HH)+1], \quad \text{Eq. (2)}$$

where V=wind velocity, HH=height 1 (lower height), h=height 2 (upper height), a=first quadratic fit coefficient, and b=second quadratic fit coefficient.

The fitted quadratic model fits one quadratic function ($a_i$, $b_i$) of shear to five different elevations of wind speed, where i represents the elevation. Characteristics $a_i$ and $b_i$ are the coefficients of the quadratic model, where a represents curvature and b represents the slope. The characteristic b is close to α (alpha) when the wind profile is close to the power law. As with the wind shear exponent α (alpha) above, characteristics $a_i$ and $b_i$ are determined by minimizing mean squared error between actual velocity measurements determined by sensors 240 over a range of altitudes and predicted velocities over the range of altitudes. Typically, the curvature coefficient a will be small for a flat profile and larger for a low level jet profile.

When the fitted quadratic model is rewritten in its derivative form, the quadratic fit coefficient b' is the inferred wind shear characteristic, and equals the shear exponent α given in the power law. This can be proven using a Taylor expansion of the power law to prove that b'=α. As such, in some embodiments, computing device 105 is configured to identify α or the quadratic characteristics independent of the type of profile. In these embodiments, the step of identifying the type of profile (for example, power law, LLJ, or flat) is not performed after inferring the characteristic(s).

The shear profiles are driven by different power differentials. The power law describes normal shear. The low level jet stream profile has lower energy than the corresponding power law based on measurement up to hub height (wind speed decreases with height). The flat jet stream describes a flatter shear curve than the power law, resulting in higher energy in the wind profile (wind speed increases with height at a sharper rate than normal shear). The operation of the wind turbine can be enhanced depending on the wind conditions described by the shear profile.

Computing device 105 is further configured to generate at least one wind turbine regulation device command signal based upon the inferred wind shear characteristic. Computing device 105 is also further configured to transmit the at least one wind turbine regulation device command signal to wind turbine regulation device 250. Wind turbine regulation device 250 is configured to receive the at least one wind turbine regulation device command signal to regulate operation of wind turbine 300. Wind turbine regulation device 250 includes, but is not limited to, a pitch regulator to adjust blade pitch, a torque regulator to modulate torque in a drive train, a yaw regulator to modify a yaw position of wind turbine 300, and a mechanical brake regulator to engage a braking device for the drive train.

Regulating the operation of wind turbine 300 includes, but is not limited to, controlling the yaw of wind turbine 300, controlling the pitch of at least one of the turbine blades (not shown in FIG. 2), controlling the power electronic converters connected to the turbine generator, controlling the power generated by wind turbine 300, controlling the rotational speed of the turbine rotor, and controlling the torque of wind turbine 300. For example, the wind turbine regulation device command signal commands the wind turbine regulation device to change the pitch of one or more rotor blade to enhance the torque or lower the loads given a particular wind shear profile.

The technical effects of using an inferred wind characteristic to at least partially control the wind turbine includes, without limitation, increasing energy production, improving life of wind turbine components, validating performance, improving fine pitch control, troubleshooting issues, and providing general information capabilities. For example, the inferred wind shear characteristic is used to increase energy production by fine pitch control or other turbine control methods, provide insight to reduce unnecessary protective tripping or curtailment that are not appropriate for the given shear profile, and/or for farm level optimization.

Moreover, wind turbine control system 200 described herein facilitates enhanced control of wind turbine 300 and/or a plurality of wind turbines 300 in a wind turbine park. Specifically, the embodiments described herein facilitate enhanced control of the wind turbine through determinations of real-time, day-to-day, and seasonal estimates of wind flow in a wind turbine site. As such, the embodiments described herein facilitate enhancing power generation performance and increasing annual energy production (AEP) by taking into account the time-dependent inflow variables such as wind turbine configuration changes including turbine outages and blade contamination and erosion.

While the above example includes an inferred wind (vertical) shear characteristic, a wind characteristic could also be inferred for, but not limited to, directional variations, wind speed at various heights, veer, turbulence intensity, yaw misalignment, up-flow, horizontal shear, waked state, and non-waked state. These wind characteristics could have one or more profiles that could be described by one or more models, including, but not limited to, a power law model. In alternative embodiments, one or more wind characteristics are inferred using a known single parameter model, such as a linear model or a power law.

The process described above is applicable in a number of contexts. In this case, shear is generally described using a single characteristic model and the classification step identifies when the model is inadequate. However, other characteristics may be characterized as well by models. For example, in alternative embodiments, the systems and methods described herein use a single characteristic model to infer at least one characteristic. The at least one characteristic includes, but is not limited to, a wind shear characteristic. Thus, the method is generalizable and scalable beyond shear.

In addition, different applications may emphasize different parts of the described process. For example, in one implementation, profile classification (e.g. power law, low level jet, or flat jet) to explain turbine underperformance may be emphasized, without a need to accurately model the exact shear profile. Whereas, in another implementation the profile classification is not as important as the characteristic inference. The described systems and methods provide flexibility for both.

Computing device 105 interacts with a first operator 230, e.g., without limitation, via user input interface 130 and/or presentation interface 120. In one embodiment, computing device 105 presents information about wind turbine 300, such as measured blade pitch positions, to operator 230. Other devices 220 interact with a second operator 235, e.g., without limitation, via user input interface 130 and/or presentation interface 120. For example, other devices 220 present operational information to second operator 235. As used herein, the term "operator" includes any person in any capacity associated with operating and maintaining wind turbine 300, including, without limitation, shift operations personnel, maintenance technicians, and facility supervisors.

Figure 3:
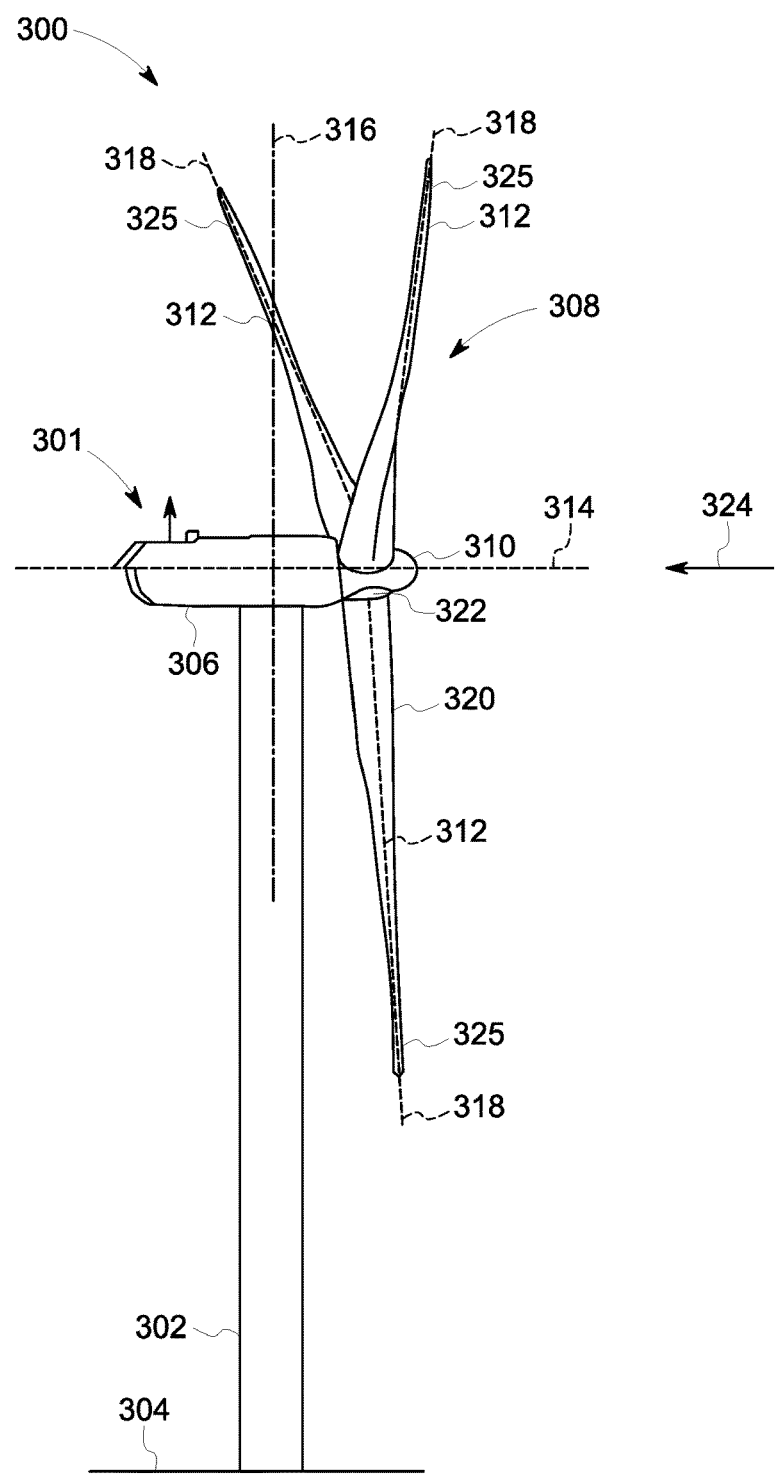
FIG. 3 is a schematic view of an exemplary wind turbine that is regulated through the wind turbine control system shown in FIG. 2.

FIG. 3 is a schematic view of an exemplary wind turbine 300 that is monitored and controlled through wind turbine control system 200 (shown in FIG. 2). In the exemplary embodiment, wind turbine 300 is a horizontal axis wind turbine. Wind turbine 300 includes a tower 302 extending from a supporting surface 304, a nacelle 306 coupled to tower 302, and a rotor 308 coupled to nacelle 306. Rotor 308 has a rotatable hub 310 and a plurality of rotor blades 312 coupled to hub 310. In the exemplary embodiment, rotor 308 has three rotor blades 312. Alternatively, rotor 308 has any number of rotor blades 312 that enables wind turbine 300 to function as described herein. In the exemplary embodiment, tower 302 is fabricated from tubular steel and has a cavity (not shown in FIG. 3) extending between supporting surface 304 and nacelle 306. Alternatively, tower 302 is any tower that enables wind turbine 300 to function as described herein including, but not limited to, a lattice tower. The height of tower 302 is any value that enables wind turbine 300 to function as described herein.

Blades 312 are positioned about rotor hub 310 to facilitate rotating rotor 308, thereby transferring kinetic energy from wind 324 into usable mechanical energy, and subsequently, electrical energy. Rotor 308 and nacelle 306 are rotated about tower 302 on a yaw axis 316 to control the perspective of blades 312 with respect to the direction of wind 324. Blades 312 are mated to hub 310 by coupling a blade root portion 320 to hub 310 at a plurality of load transfer regions 322. Load transfer regions 322 have a hub load transfer region and a blade load transfer region (both not shown in FIG. 3). Loads induced in blades 312 are transferred to hub 310 via load transfer regions 322. Each of blades 312 also includes a blade tip portion 325.

In the exemplary embodiment, blades 312 have a length between 50 meters (m) (164 feet (ft)) and 100 m (328 ft), however these characteristics form no limitations to the instant disclosure. Alternatively, blades 312 have any length that enable wind turbine to function as described herein. As wind 324 strikes each of blades 312, aerodynamic forces (not shown) are induced on each of blades 312 and rotation of rotor 308 about rotation axis 314 is induced as blade tip portions 325 are accelerated. A pitch position, or pitch angle (not shown) of blades 312, i.e., an angle that determines each of blades' 312 orientation with respect to the rotor plane, is changed by a pitch adjustment mechanism (not shown in FIG. 3).

Further, in FIG. 3, reference numeral 324 is generally representative of wind. Since wind 324 is distributed spatially and temporally, wind speed varies significantly at different points over the area swept by wind turbine blades 312. Therefore, different portions of wind turbine 300 experience different wind speeds. The pitch angles of blades 312 are adjusted about a pitch axis 318 for each of blades 312. In the exemplary embodiment, the pitch angles of blades 312 are controlled individually. Alternatively, blades' 312 pitch is controlled as a group. Still further alternatively, the pitch of the blades are modulated.

Figure 4:
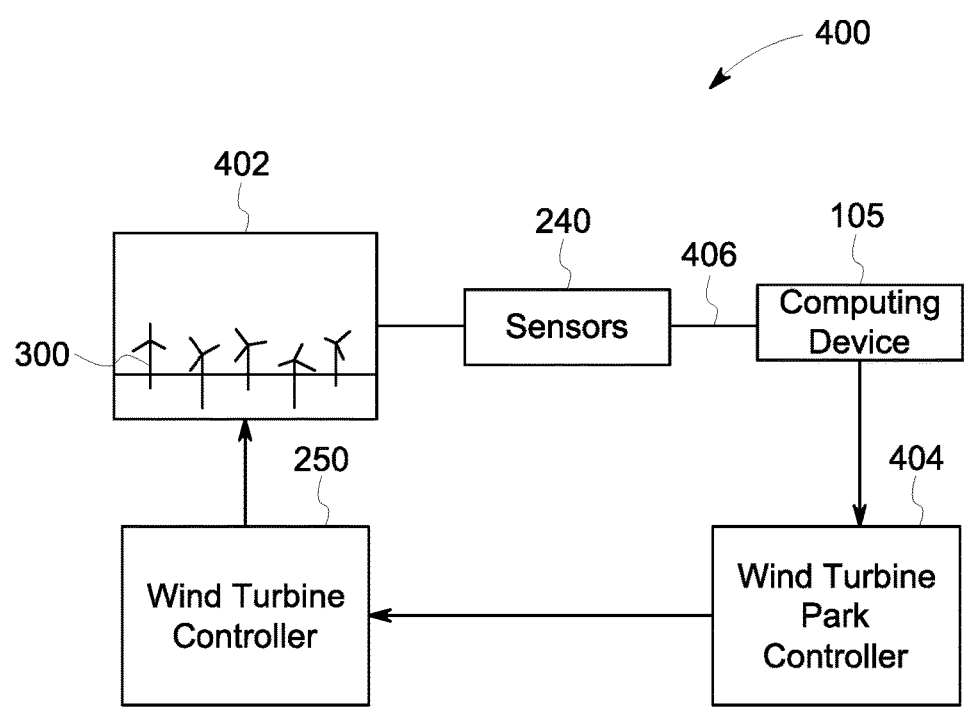
FIG. 4 is a schematic view of an exemplary wind turbine park control system that is used to regulate a plurality of the wind turbines shown in FIG. 3.

FIG. 4 is a schematic view of an exemplary wind turbine park control system 400. In the exemplary embodiment, system 400 includes sensors 240 located proximate to, in, within, on, or otherwise attached to, at least one component of at least one wind turbine 300 in a wind turbine park 402. System 400 includes wind turbine control system 200. Alternatively, wind turbine control system 400 is a portion of any other system or systems regardless of the architecture of wind turbine control system 200.

In the exemplary embodiment, wind turbine park control system 400 includes wind turbine park regulation device 404 and a plurality of wind turbine regulation devices 250 coupled to wind turbine park regulation device 404. Sensors 240 are coupled to computing device 105 through a network 406 or data transmission cable 406. Park regulation device 404 primarily controls each wind turbine 300 in wind turbine park 402 through wind turbine regulation devices 250 as a function of an inferred wind characteristic, such as an inferred wind shear characteristic, based on analyses by computing device 105. This may include regulating the angular rotor speed (revolutions per minute, i.e., rpm) and pitch angles of blades 312 about pitch axis 318 (both shown in FIG. 3). Computing device 105 is configured to generate and transmit at least one wind turbine regulation device command signal to park regulation device 404. Park regulation device 404 transmits the wind turbine regulation device command signal to regulation devices 250 to regulate operation of wind turbines 300 in wind turbine park 402.

In an alternative embodiment, wind turbine park control system 400 does not include wind turbine park regulation device 404 and computing device 105 communicates directly with wind turbine regulation devices 250.

Figure 5:
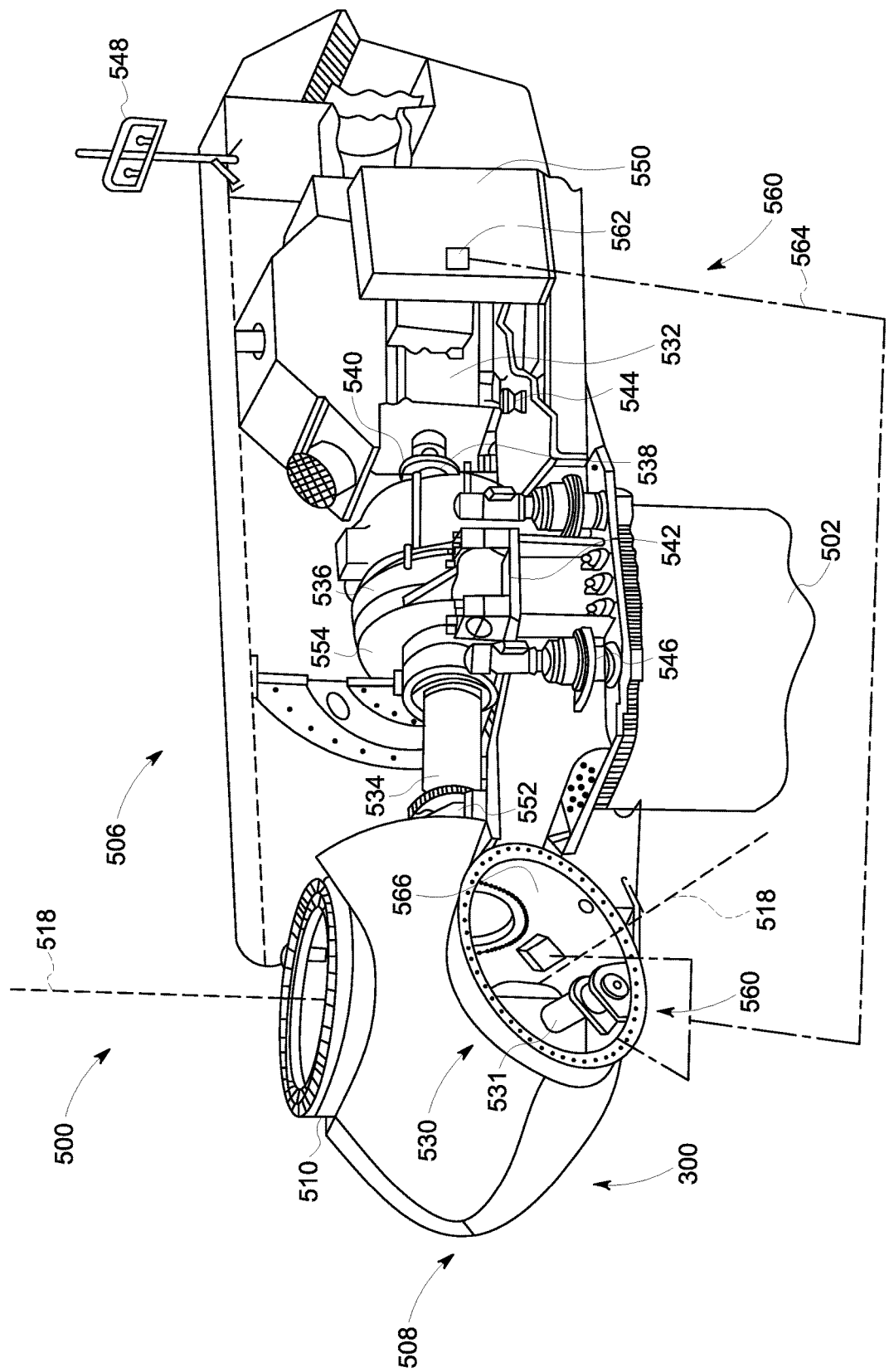
FIG. 5 is a cross-sectional schematic view of a nacelle of the wind turbine shown in FIG. 3.

FIG. 5 is a cross-sectional schematic view of nacelle 506 of exemplary wind turbine 300. Various components of wind turbine 300 are housed in nacelle 506 atop tower 502 of wind turbine 300. Nacelle 506 includes one pitch drive mechanism 530 that is coupled to one blade 312 (shown in FIG. 3), where mechanism 530 modulates the pitch of associated blade 312 along pitch axis 518. In the exemplary embodiment, the pitch drive mechanism 530 includes at least one pitch drive motor 531.

Nacelle 506 also includes a rotor 508 that is rotatably coupled to an electric generator 532 positioned within nacelle 506 via rotor shaft 534, a gearbox 536, a high speed shaft 538, and a coupling 540. Rotation of shaft 534 rotatably drives gearbox 536 that subsequently rotatably drives shaft 538. Shaft 538 rotatably drives generator 532 via coupling 540 and shaft 538 rotation facilitates generator 532 production of electrical power. Gearbox 536 and generator 532 are supported by supports 542 and 544, respectively. In the exemplary embodiment, gearbox 536 utilizes a dual path geometry to drive high speed shaft 538. Alternatively, main rotor shaft 534 is coupled directly to generator 532 via coupling 540.

Nacelle 506 further includes a yaw adjustment mechanism 546 that is used to rotate nacelle 506 and rotor 508 on an axis to control the perspective of blades 312 with respect to the direction of the wind. Nacelle 506 also includes at least one meteorological mast 548, where mast 548 includes a wind vane and anemometer. Mast 548 provides information to a turbine control system (not shown) that includes wind direction and/or wind speed.

A portion of the turbine control system resides within a control panel 550. Nacelle 506 further includes forward and aft support bearings 552 and 554, respectively, where bearings 552 and 554 facilitate radial support and alignment of shaft 534.

Wind turbine 300 includes a pitch control system 560, where at least a portion of pitch control system 560 is positioned in nacelle 506, or alternatively, outside nacelle 506. Specifically, at least a portion of pitch control system 560 described herein includes at least one wind turbine regulation device, i.e., processor 562 and a memory device (not shown), and at least one input/output (I/O) conduit 564, where conduit 564 includes at least one I/O channel (not shown). More specifically, processor 562 is positioned within control panel 550. In some embodiments, processor 562 is substantially similar to, or includes, processor 115 (shown in FIG. 1).

Processor 562 and other processors (not shown) as described herein process information transmitted from a plurality of electrical and electronic devices that includes, but not be limited to, blade pitch position feedback devices 566 (described further below) and electric power generation feedback devices (not shown). RAM and storage devices (not shown) store and transfer information and instructions to be executed by processor 562. RAM and storage devices can also be used to store and provide temporary variables, static (i.e., non-changing) information and instructions, or other intermediate information to processor 562 during execution of instructions by processor 562. Instructions that are executed include, but are not limited to, resident blade pitch system control commands. The execution of sequences of instructions is not limited to any specific combination of hardware circuitry and software instructions.

In the exemplary embodiment, at least a portion of pitch control system 560 including, but not limited to, processor 562 is positioned within control panel 550. Moreover, processor 562 is coupled to blade pitch drive motors 531 via at least one I/O conduit 564. I/O conduit 564 includes any number of channels having any architecture including, but not limited to, Cat 5/6 cable, twisted pair wiring, and wireless communication features. Pitch control system 560 includes distributed and/or centralized control architectures, or any combination thereof.

Pitch control system 560 also includes a plurality of independent blade pitch position feedback devices 566 coupled with processor 562 via at least one I/O conduit 564. In the exemplary embodiment, each pitch drive mechanism 530 is associated with a single blade pitch position feedback device 566 (also known as a blade pitch position device or a position feedback device). Alternatively, any number of blade pitch position feedback devices 566 are associated with each mechanism 530. Therefore, in the exemplary embodiment, mechanism 530 and associated drive motor 531, as well as device 566, are included in system 560 as described herein. Each blade pitch position feedback device 566 measures a pitch position of each blade 312 with respect to rotor hub 510. Blade pitch position feedback device 566 is any suitable sensor having any suitable location within or remote to wind turbine 300, such as, but not limited to, optical angle encoders, magnetic rotary encoders, and incremental encoders, or some combination thereof. Moreover, blade pitch position feedback device 566 transmits pitch measurement signals (not shown) that are substantially representative of associated blade 312 pitch position to processor 562 for processing thereof.

Figure 6:
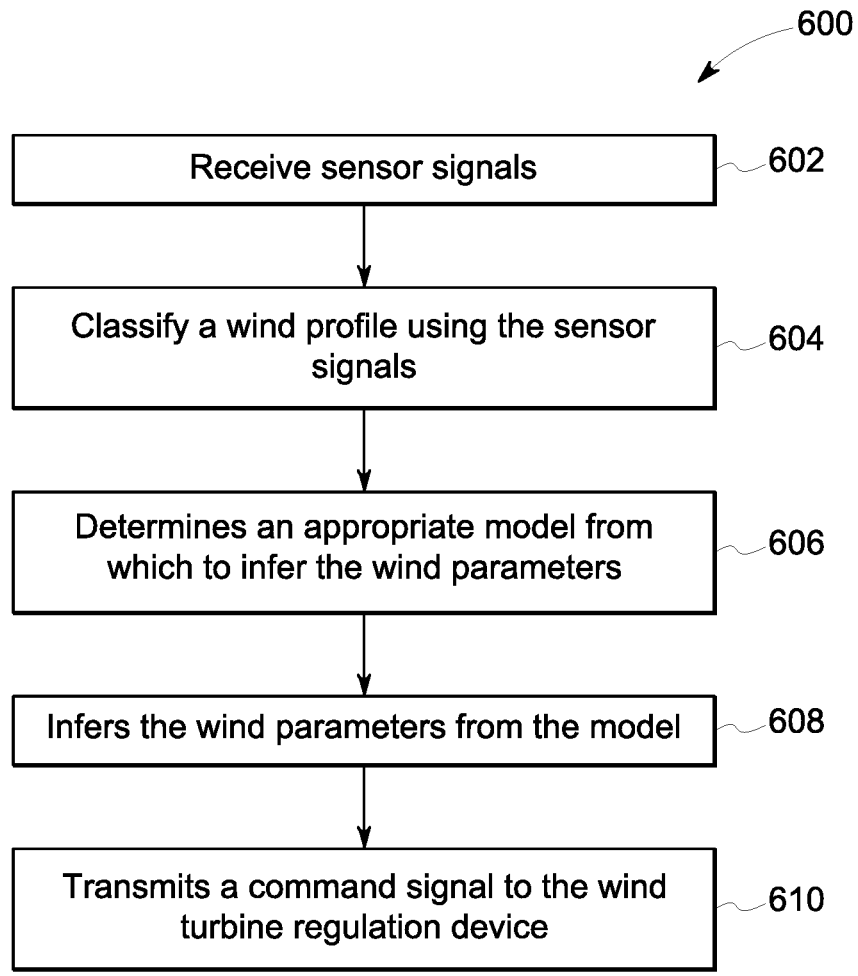
FIG. 6 is a schematic view of an exemplary method to infer wind characteristics to regulate the operation of the wind turbine shown in FIG. 3.

FIG. 6 is a schematic view of an exemplary method 600 to infer one or more wind characteristics to at least partially regulate the operation of exemplary wind turbine 300 (shown in FIG. 3). Referring to FIGS. 1, 2, 3, and 6, monitoring sensors 240 on wind turbine 300 transmit measurement sensor signals to computing device 105. Computing device 105 receives 602 the measurement sensor signals, which include measurement data. Computing device 105 uses a machine learning method, such as random forests, on the measurement data to classify 604 a wind profile. Based on the wind profile, computing device 105 determines 606 an appropriate model from which to infer the one or more wind characteristics. Computing device 105 then infers the one or more wind characteristics using the model.

Computing device 105 transmits 610 a command signal, based upon the one or more inferred wind characteristics, to a wind turbine regulation device to regulate the wind turbine.

Figure 7:
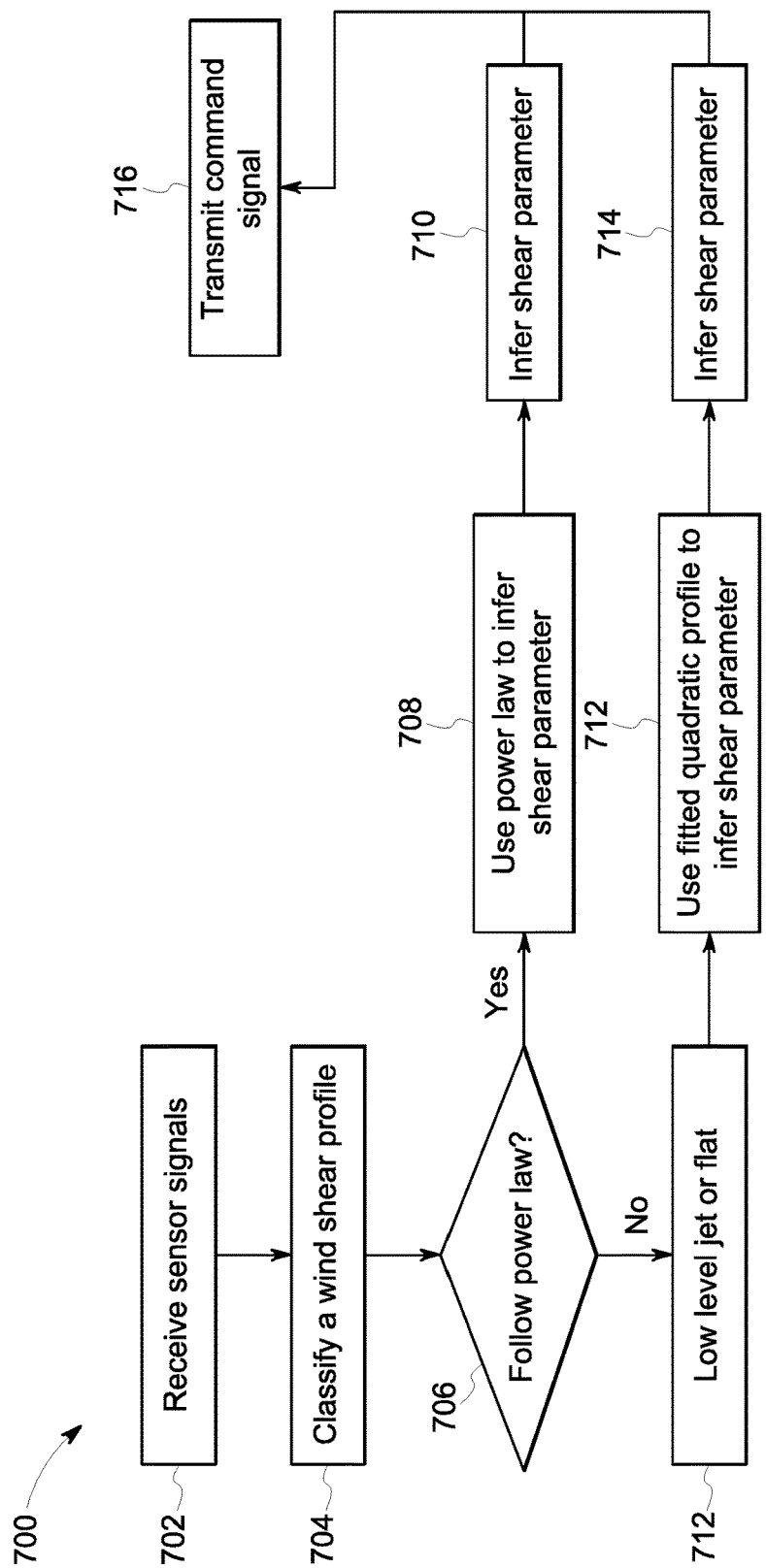
FIG. 7 is a schematic view of an exemplary method to infer a wind shear characteristic to regulate the operation of the wind turbine shown in FIG. 3.

FIG. 7 is a schematic view of an exemplary method 700 to infer a wind shear characteristic as described in FIG. 3. Referring to FIGS. 1, 2, 3, and 6, monitoring sensors 240 on exemplary wind turbine 300 transmit measurement sensor signals to computing device 105. Computing device 105 receives 702 the measurement sensor signals, which include measurement data. Computing device 105 uses a machine learning method, such as random forests, on the measurement data to classify 704 a wind shear profile. In particular, computing device 105 uses a machine learning method on the sensor measurement data to classify whether the wind shear profile behaves 706 according to a wind profile power law.

If the wind shear profile behaves according to the power law, computing device 105 uses 708 the power law as the appropriate model from which to infer 710 the wind shear characteristic. Accordingly, computing device 105 uses an alpha (a) characteristic of the power law as the inferred wind shear characteristic.

If the wind shear profile does not behave according to the wind profile power law, computing device 105 uses 712 a low level jet (LLJ) stream or a flat jet stream as the appropriate model from which to infer the wind shear characteristic. Accordingly, computing device 105 uses a fitted quadratic model to infer 714 the wind shear characteristic. Based on the process described above, computing device 105 uses a quadratic fit coefficient (a' and b') as the inferred wind shear characteristic.

Computing device 105 transmits 716 a command signal, based upon the inferred wind shear characteristic, to a wind turbine regulation device to regulate the wind turbine.

Figure 8:
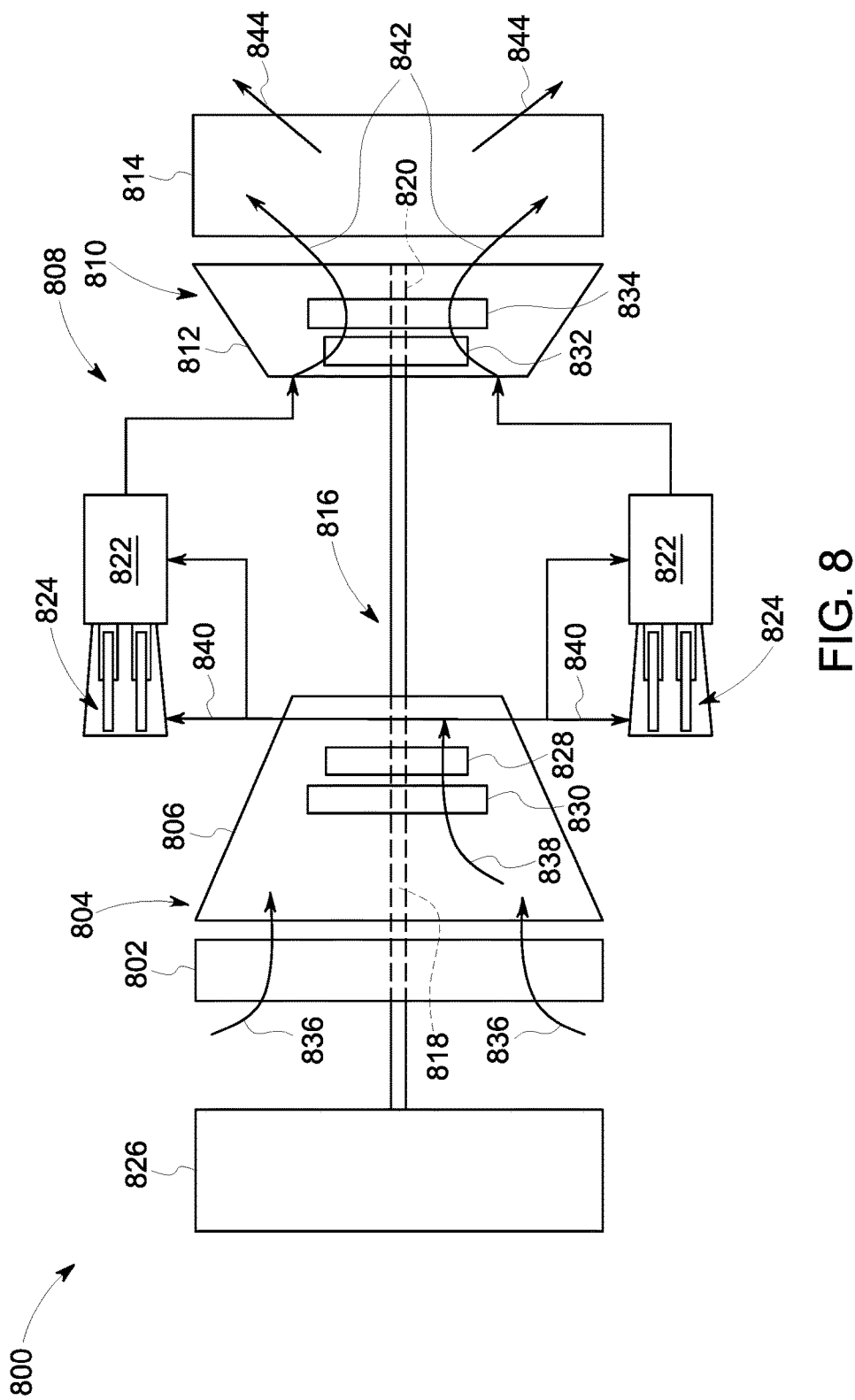
FIG. 8 is a schematic view of a high-temperature asset, i.e., a turbomachine, and more specifically, in the exemplary embodiment, a gas turbine engine that may be used with the computing device shown in FIG. 1.

FIG. 8 is a schematic view of a high-temperature asset, i.e., a turbomachine, and more specifically, in the exemplary embodiment, a gas turbine engine 800 that may be used with computing device 105 (shown in FIG. 1). Alternatively, inferring one or more characteristics in any high-temperature apparatus, system, and facility may be monitored and detected using a system substantially similar to the system as described herein, including, without limitation, combustion systems such as fossil-fired furnaces, gasification systems, boilers, steam turbines, and the associated high-temperature exhaust systems.

In the exemplary embodiment, gas turbine engine 800 includes an air intake section 802, and a compressor section 804 that is coupled downstream from, and in flow communication with, intake section 802. Compressor section 804 is enclosed within a compressor casing 806. A combustor section 808 is coupled downstream from, and in flow communication with, compressor section 804, and a turbine section 810 is coupled downstream from, and in flow communication with, combustor section 808. Gas turbine engine 800 is enclosed within a turbine casing 812 and includes an exhaust section 814 that is downstream from turbine section 810. Moreover, in the exemplary embodiment, turbine section 810 is coupled to compressor section 804 via a rotor assembly 816 that includes, without limitation, a compressor rotor, or drive shaft 818 and a turbine rotor, or drive shaft 820.

In the exemplary embodiment, combustor section 808 includes a plurality of combustor assemblies, i.e., combustors 822 that are each coupled in flow communication with compressor section 804. Combustor section 808 also includes at least one fuel nozzle assembly 824. Each combustor 822 is in flow communication with at least one fuel nozzle assembly 824. Moreover, in the exemplary embodiment, turbine section 810 and compressor section 804 are rotatably coupled to a load 826 via drive shaft 818. For example, load 826 may include, without limitation, an electrical generator or a mechanical drive application, e.g., a pump. Alternatively, gas turbine engine 800 may be an aircraft engine. In the exemplary embodiment, compressor section 804 includes at least one compressor blade assembly 828, i.e., blade 828 and at least one adjacent stationary vane assembly 830.

Also, in the exemplary embodiment, turbine section 810 includes at least one turbine blade assembly, i.e., bucket 832 and at least one adjacent stationary nozzle assembly 834. Each compressor blade assembly 828 and each turbine bucket 832 are coupled to rotor assembly 816, or, more specifically, compressor drive shaft 818 and turbine drive shaft 820.

In operation, air intake section 802 channels air 836 towards compressor section 804. Compressor section 804 compresses inlet air 836 to higher pressures and temperatures prior to discharging compressed air 838 towards combustor section 808. Compressed air 840 is channeled to fuel nozzle assembly 824, mixed with fuel (not shown), and burned within each combustor 822 to generate combustion gases 842 that are channeled downstream towards turbine section 810. Combustion gases 842 generated within combustors 822 are channeled downstream towards turbine section 810. After impinging turbine bucket 832, thermal energy is converted to mechanical rotational energy that is used to drive rotor assembly 816. Turbine section 810 drives compressor section 804 and load 826 via drive shafts 818 and 820, and exhaust gases 844 are discharged through exhaust section 814 to ambient atmosphere.

In the exemplary embodiment, gas turbine engine 800 also includes a plurality of monitoring sensors (for example, sensors 240), which are disposed in predetermined locations throughout the system. The plurality of sensors includes, but is not limited to, temperature sensors, accelerometers, vibration sensors, and pressure sensors. The sensors are coupled to computing device 105 (not shown) to allow gas turbine engine 800 to be used with the system described herein to infer one or more characteristics. Other dynamic systems that may be used with the system include, but are not limited to, downhole systems. Accordingly, ones skilled in the art will be able to determine other dynamic systems with sensors that would benefit from the described system.

The above described wind turbine control system provides a method for inferring one or more characteristics using one or more sensors. The one or more characteristics are inferred in real-time and are used to regulate operation of a dynamic system, such as a wind turbine. Specifically, the embodiments described herein include control systems that utilize sensor measurements to (1) classify a profile to determine an appropriate model from which the one or more characteristics are inferred, and (2) infer the one or more characteristics from the model. In the exemplary embodiment, a wind turbine control system is configured to infer one or more wind characteristics using sensor measurements and control the operation of the wind turbine at least partially using the one or more wind characteristics.

An exemplary technical effect of the methods, systems, and apparatus described herein includes at least one of: (a) real-time knowledge of conditions affecting a dynamic system is used in control strategies for the dynamic system; (b) real-time knowledge of wind conditions on a wind turbine site is used in control strategies for one or more of the following: enhancing power generation performance, increasing annual energy production (AEP), and reducing mechanical loads; (c) increasing the accuracy in predicting the power performance and loads of wind turbines under different wind conditions; (d) improving a life span of mechanical components, including wind turbine components; (e) troubleshooting issues; (f) providing general information capabilities; (g) providing insight to reduce unnecessary protective tripping or curtailment of wind turbines that is not appropriate for a given wind profile; and (h) wind farm level optimization.

Exemplary embodiments of methods and systems for monitoring and controlling dynamic systems are not limited to the specific embodiments described herein, but rather, components of systems and/or steps of the methods may be utilized independently and separately from other components and/or steps described herein. For example, the methods may also be used in combination with other wind turbine systems requiring in-situ recognition of wind inflow conditions and are not limited to practice with only the wind turbines and methods as described herein. Rather, the exemplary embodiment can be implemented and utilized in connection with many other applications, equipment, and systems that may benefit from physics-based modeling and control in an operating environment with wind inflow conditions.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A control system for a dynamic system, said control system comprising:
   at least one measurement sensor coupled to the dynamic system;
   at least one regulation device configured to regulate operation of the dynamic system as a function of at least one dynamic system characteristic; and
   at least one computing device coupled to said at least one measurement sensor and said at least one regulation device, said at least one computing device configured to:
      receive at least one measurement signal from said at least one measurement sensor, wherein the at least one measurement signal includes measurement data;
      classify, using the measurement data, a wind shear profile of the dynamic system from which to infer the at least one dynamic system characteristic;
      infer the at least one dynamic system characteristic based, at least in part, on the wind shear profile;
      generate at least one regulation device command signal based, at least in part, on the inferred at least one dynamic system characteristic;
   wherein the dynamic system is a wind turbine;
   wherein said at least one computing device is further configured to classify the wind shear profile using a random forests algorithm on the measurement data;
   wherein the at least one regulation device command signal is utilized to change the pitch of one or more rotor blades of the wind turbine to enhance a wind turbine torque;
   wherein the said at least one computing device is further configured to:
      classify the wind shear profile and to determine whether the measurement data is consistent with a wind shear power law profile;
      determine that the measurement data is not consistent with the wind shear power law profile, wherein the at least one computing device uses a fitted quadratic model to infer a wind shear characteristic as the at least one dynamic system characteristic; and
   wherein the fitted quadratic model is given by:

$$V(h)=V(HH)[a(h-HH)^2+b(h-HH)+1],$$

where V=wind velocity, HH=lower height, h=upper height, a=first quadratic fit coefficient, and b=second quadratic fit coefficient.

2. The control system in accordance with claim 1, wherein the wind shear power law profile includes a shear exponent $\alpha$, said at least one computing device further configured to determine that the measurement data is consistent with the wind shear power law profile, wherein said at least one computing device uses the shear exponent $\alpha$ (alpha) as the at least one dynamic system characteristic.

3. The control system in accordance with claim 1, wherein said at least one computing device is further configured to infer the at least one dynamic system characteristic for at least one of directional variations, wind speeds at one or more heights, veer, density, turbulence intensity, yaw misalignment, up-flow, vertical shear, horizontal shear, waked state, and non-waked state.

4. The control system in accordance with claim 1, wherein said at least one computing device uses a single characteristic model to infer the at least one dynamic system characteristic.

5. A method for controlling a dynamic system, the dynamic system including at least one measurement sensor, at least one regulation device, and at least one computing device coupled to the at least one measurement sensor and the at least one regulation device, said method comprising:
   receiving, by the at least one computing device, at least one measurement signal from the at least one measurement sensor, wherein the at least one measurement signal includes measurement data;
   classifying, by the at least one computing device using a random forests algorithm on the measurement data, a wind shear profile of the dynamic system from which to infer at least one dynamic system characteristic;
   inferring, by the at least one computing device, the at least one dynamic system characteristic based, at least in part, on the wind shear profile;
   generating, by the at least one computing device, at least one regulation device command signal based, at least in part, on the inferred at least one dynamic system characteristic;
   wherein the dynamic system is a wind turbine;
   wherein the at least one regulation device command signal is utilized to change the pitch of one or more rotor blades of the wind turbine to enhance a wind turbine torque;
   wherein the method further comprises:
      classifying, by the at least one computing device, the wind shear profile and to determine whether the measurement data is consistent with a wind shear power law profile;
      determining, by the at least one computing device, that the measurement data is not consistent with the wind shear power law profile, wherein the at least one computing device uses a fitted quadratic model to infer a wind shear characteristic as the at least one dynamic system characteristic; and wherein the fitted quadratic model is given by:

$$V(h)=V(HH)[a(h-HH)^2+b(h-HH)+1],$$

where V=wind velocity, HH=lower height, h=upper height, a=first quadratic fit coefficient, and b=second quadratic fit coefficient.

6. The method in accordance with Claim 5, wherein the wind shear power law profile includes a shear exponent α, the method further comprising determining, by the at least one computing device, that the measurement data is consistent with the wind shear power law profile, wherein the at least one computing device uses the shear exponent α (alpha) as the at least one dynamic system characteristic.

7. The method in accordance with claim 5 further comprising inferring, by the at least one computing device, the at least one dynamic system characteristic for at least one of directional variations, wind speeds at one or more heights, veer, density, turbulence intensity, yaw misalignment, up-flow, vertical shear, horizontal shear, waked state, and non-waked state.

8. The method in accordance with claim 5 further comprising using, by the at least one computing device, a single characteristic model to infer the at least one dynamic system characteristic.

9. A wind turbine park comprising:
a plurality of wind turbines;
at least one measurement sensor coupled to at least one wind turbine of said plurality of wind turbines;
at least one wind turbine regulation device configured to regulate operation of said at least one wind turbine as a function of at least one wind characteristic; and
at least one computing device coupled to said at least one measurement sensor and said at least one wind turbine regulation device, said at least one computing device configured to:
  receive at least one measurement signal from said at least one measurement sensor, wherein the at least one measurement signal includes measurement data;
  classify, using the measurement data, a wind shear profile from which to infer the at least one wind characteristic;
  infer the at least one wind characteristic based, at least in part, on the wind shear profile;
  generate at least one wind turbine regulation device command signal based, at least in part, on the at least one wind characteristic;
  wherein said at least one computing device is further configured to classify the wind shear profile using a random forests algorithm;
  wherein the at least one wind turbine regulation device command signal is utilized to change the pitch of one or more rotor blades of the at least one wind turbine to enhance a wind turbine torque;
wherein the said at least one computing device is further configured to:
  classify the wind shear profile and to determine whether the measurement data is consistent with a wind shear power law profile;
  determine that the measurement data is not consistent with the wind shear power law profile, wherein the at least one computing device uses a fitted quadratic model to infer a wind shear characteristic as the at least one wind characteristic; and
wherein the fitted quadratic model is given by:

$$V(h)=V(HH)[a(h-HH)^2+b(h-HH)+1],$$

where V=wind velocity, HH=lower height, h=upper height, a=first quadratic fit coefficient, and b=second quadratic fit coefficient.

10. The wind turbine park in accordance with claim 9, wherein the wind shear power law profile includes a shear exponent α, said at least one computing device further configured to determine that the measurement data is consistent with the wind shear power law profile, wherein said at least one computing device uses the shear exponent α (alpha) as the at least one wind characteristic.

11. The wind turbine park in accordance with claim 9, wherein said at least one computing device is further configured to infer the at least one wind characteristic for at least one of directional variations, wind speeds at one or more heights, veer, density, turbulence intensity, yaw misalignment, up-flow, vertical shear, horizontal shear, waked state, and non-waked state.

12. The wind turbine park in accordance with claim 9, wherein said at least one computing device uses a single characteristic model to infer the at least one wind characteristic.

\* \* \* \* \*